United States Patent
Li

(10) Patent No.: US 10,647,348 B2
(45) Date of Patent: May 12, 2020

(54) VEHICLE, SINGLE-WHEELSET/DOUBLE-WHEELSET TRACKLESS TRAIN, AND TRACKING AND STEERING CONTROL METHOD THEREFOR

(71) Applicant: ZHENGZHOU RESEARCH INSTITUTE OF MECHANICAL ENGINEERING CO., LTD, Henan (CN)

(72) Inventor: Wutian Li, Henan (CN)

(73) Assignee: ZHENGZHOU RESEARCH INSTITUTE OF MECHANICAL ENGINEERING CO., LTD, Henan (CN)

( * ) Notice: Subject to any disclaimer, the term of this patent is extended or adjusted under 35 U.S.C. 154(b) by 225 days.

(21) Appl. No.: 15/555,515

(22) PCT Filed: Feb. 1, 2016

(86) PCT No.: PCT/CN2016/073046
§ 371 (c)(1),
(2) Date: Sep. 4, 2017

(87) PCT Pub. No.: WO2016/138809
PCT Pub. Date: Sep. 9, 2016

(65) Prior Publication Data
US 2018/0043930 A1  Feb. 15, 2018

(30) Foreign Application Priority Data
Mar. 4, 2015 (CN) .......................... 2015 1 0095995

(51) Int. Cl.
*B62D 6/00* (2006.01)
*B62D 13/00* (2006.01)
(Continued)

(52) U.S. Cl.
CPC ............... *B62D 6/001* (2013.01); *B62D 7/14* (2013.01); *B62D 7/159* (2013.01); *B62D 12/02* (2013.01); *B62D 13/005* (2013.01); *B62D 53/005* (2013.01)

(58) Field of Classification Search
CPC .... B62D 12/02; B62D 13/005; B62D 53/005; B62D 6/001; B62D 7/14; B62D 7/159
(Continued)

(56) References Cited

U.S. PATENT DOCUMENTS 5,289,892 A * 3/1994 Notsu ..................... B62D 7/144
180/405
5,329,451 A * 7/1994 Notsu ..................... B62D 7/144
280/426

(Continued)

FOREIGN PATENT DOCUMENTS

| CN | 103057586 | 4/2013 |
|---|---|---|
| CN | 103465797 | 12/2013 |

(Continued)

OTHER PUBLICATIONS

"Office Action of Japan Counterpart Application," dated Mar. 12, 2019, p. 1-p. 5.

(Continued)

*Primary Examiner* — Angelina Shudy
(74) *Attorney, Agent, or Firm* — JCIPRNET

(57) ABSTRACT

A vehicle, a single-wheelset/double-wheelset trackless train and a tracking and steering control method therefor are provided in the invention. The method includes the following steps. During traveling of the vehicle, steering information of the vehicle is continually collected by the controller. Information about a guiding front wheel turning angle, a controlled rear wheel turning angle, a vehicle body position angle, an included angle between vehicle bodies, and a (Continued)

vehicle travel time and speed is collected; an interval for data collection is determined according to a distance between a guiding front wheel and a controlled rear wheel; and when the controlled rear wheel travels to a certain point near a front wheel travel track, the controlled rear wheel is controlled to travel in a travel direction same as that when the front wheel travels to the point. According to the rear wheel tracking and steering control method, the objective that a controlled rear wheel operates in a manner of highly approaching a guiding front wheel track can be achieved; and the higher a data collection frequency is, the higher a track fitting degree of the front wheel and the rear wheel is.

2 Claims, 5 Drawing Sheets

(51) Int. Cl.
*B62D 7/15* (2006.01)
*B62D 7/14* (2006.01)
*B62D 12/02* (2006.01)
*B62D 53/00* (2006.01)

(58) Field of Classification Search
USPC .......................................................... 701/41
See application file for complete search history.

(56) References Cited

U.S. PATENT DOCUMENTS

| | | | | |
|---|---|---|---|---|
| 6,292,094 | B1* | 9/2001 | Deng | B62D 7/159 |
| | | | | 340/431 |
| 6,806,809 | B2* | 10/2004 | Lee | B60D 1/58 |
| | | | | 280/419 |
| 9,446,713 | B2* | 9/2016 | Lu | B60R 1/002 |
| 9,836,060 | B2* | 12/2017 | Ghneim | B60R 1/12 |
| 9,914,495 | B2* | 3/2018 | Han | B62D 53/00 |
| 10,384,607 | B2* | 8/2019 | Lavoie | B60R 1/00 |
| 2003/0057671 | A1* | 3/2003 | Schaedler | B62D 7/144 |
| | | | | 280/99 |
| 2004/0130441 | A1* | 7/2004 | Lee | B60D 1/58 |
| | | | | 340/431 |
| 2008/0246253 | A1 | 10/2008 | Timmons | |
| 2009/0236823 | A1* | 9/2009 | Prem | B62D 13/005 |
| | | | | 280/426 |
| 2015/0002670 | A1* | 1/2015 | Bajpai | G06K 9/00791 |
| | | | | 348/148 |
| 2015/0367885 | A1* | 12/2015 | Bruns | B62D 13/00 |
| | | | | 280/408 |
| 2016/0023526 | A1* | 1/2016 | Lavoie | B60D 1/305 |
| | | | | 701/41 |
| 2019/0031238 | A1* | 1/2019 | Kim | B60D 1/30 |

FOREIGN PATENT DOCUMENTS

| | | |
|---|---|---|
| CN | 203681649 | 7/2014 |
| CN | 104773202 | 7/2015 |
| JP | H01202581 | 8/1989 |
| JP | H02144880 | 12/1990 |
| JP | 2515731 | 10/1996 |
| JP | H09286346 | 11/1997 |

OTHER PUBLICATIONS

"International Search Report (Form PCT/ISA/210)", dated May 6, 2016, with English translation thereof, pp. 1-4.

"Office Action of Japan Counterpart Application," dated Oct. 8, 2019, p. 1-p. 4.

* cited by examiner

VEHICLE, SINGLE-WHEELSET/DOUBLE-WHEELSET TRACKLESS TRAIN, AND TRACKING AND STEERING CONTROL METHOD THEREFOR

CROSS-REFERENCE TO RELATED APPLICATION

This application is a 371 of international application of PCT application serial no. PCT/CN2016/073046, filed on Feb. 1, 2016, which claims the priority benefit of Chinese application no. 201510095995.9, filed on Mar. 4, 2015. The entirety of the each of the above-mentioned patent applications is hereby incorporated by reference herein and made a part of this specification.

BACKGROUND OF THE INVENTION

1. Field of the Invention

The present invention relates to a vehicle, a single-wheelset/double-wheelset trackless train, and a corresponding tracking and steering control method.

2. Description of Related Art

Most of rear wheels of conventional vehicles are passive steering wheels, and a requirement for different rates of left and right wheels when a vehicle turns is met by means of a rear axle differential, to implement steering with front wheels. During turning and traveling of a vehicle, a difference of radius between inner wheels is generated between travel tracks of front and rear wheels, and during turning, a vehicle body generates a relatively large centrifugal force outward, affecting a curve-passing capability and stability of the vehicle.

A rear wheel active steering system has been applied to real vehicles. Existing rear active steering systems are described as follows:

1. An active dynamic steering system: a principle is to drive a lead screw nut mechanism by using a motor, to make a lead screw move axially. Such axial movement drives rear wheels to steer slightly. When a speed of a vehicle is greater than 60 km/h, the rear wheels and the front wheels deflect towards a same direction, thereby improving curve-passing stability at a high speed; when the speed of the vehicle is less than 60 km/h, the rear wheels and the front wheels deflect towards a reverse direction, thereby improving flexibility of the vehicle.

2. An integral active steering system: a complex active steering control system. To add a rear wheel active steering function, a rear axle sideslip angle control system is configured in the system. The system is an electromechanical actuating mechanism, and mainly includes a motor that drives two toe-in control arms by using a screw drive mechanism. A maximum design stroke of reciprocal motion of the actuating mechanism is ±8 mm, which is equivalent to generating a turning angle of a maximum of ±3° on a wheel. During working, the rear wheel active steering system needs to receive various dynamic driving signals of a vehicle, and outputs a suitable turning angle after performing comprehensive determining.

Toyota Motor has many related patents in the rear wheels servo steering field, such as CN200980161399 and CN201080068096.

The Chinese Patent Application CN200910055961 also provides a front wheel and rear wheel active steering control method, in which front wheel active steering and rear wheel active steering are combined, two independent control inputs are provided, including a front wheel corrected turning angle and a rear wheel turning angle, and both a yaw rate and a sideslip angle of a vehicle are controlled, to track a response of a reference vehicle mode.

Rapid economic development is accompanied with continual urban scale expansion and a highly dense urban population, and therefore, public transportation becomes increasingly important. Existing public transportation mainly includes two types: railway trains and buses. Due to a limitation to a bus length, to improve a transport capacity, a layer may be added vertically, or a compartment may be added to the vehicle horizontally.

In a process of adding a compartment to a vehicle, problems encountered in turning and steering of the vehicle become more severe, and if an accident occurs, more damage may be caused. Therefore, perfect steering performance of the vehicle needs to be ensured.

SUMMARY OF THE INVENTION

The present invention includes the following solutions:

A vehicle includes a steering-controllable front wheel, a steering-controllable rear wheel and a controller, where during traveling of the vehicle, steering information of the vehicle is continually collected by the controller, the steering information including: information about a vehicle body position angle, a front wheel turning angle, and a rear wheel turning angle;

the vehicle body position angle is an angle representing a direction of a vehicle body; a difference between vehicle body position angles when the front wheel and the rear wheel of the vehicle respectively travel to a certain point on a travel track of the vehicle is the vehicle body turning angle; the front wheel turning angle is a wheel turning angle of a front wheel mechanism; and the rear wheel turning angle is a wheel turning angle of a rear wheel mechanism; and the controller controls the rear wheel steering so that: the rear wheel turning angle at a current position=the vehicle body turning angle at the current position−the front wheel turning angle at the current position.

A double-wheelset trackless train includes a tractor body and at least one double-wheelset trailer body, a connection bridge disposed between any two adjacent vehicle bodies, two ends of the connection bridge respectively and correspondingly connected to the two vehicle bodies by using a hinge structure, and wheelsets of the tractor body and the trailer body being steering-controllable, and further including a controller, where during traveling of the vehicle, steering information of the vehicle is continually collected by the controller, the steering information including: a vehicle body position angle, a front wheel turning angle, and a rear wheel turning angle;

the vehicle body position angle is an angle representing a direction of the vehicle body; a difference between vehicle body position angles when a front wheel and a rear wheel of the vehicle respectively travel to a certain point on a travel track of the vehicle is the vehicle body turning angle; the front wheel turning angle is a wheel turning angle of a front wheel mechanism; and the rear wheel turning angle is a wheel turning angle of a rear wheel mechanism; and the controller controls the wheels of the trailer body steering so that: the front wheel turning angle of the trailer body at a current position=the front wheel turning angle of the tractor body at the current position, and the rear wheel turning angle of the trailer body at the current position=the rear wheel turning angle of the tractor body at the current position.

The rear wheel turning angle of the tractor body at the current position=a turning angle of the tractor body at the current position−the front wheel turning angle of the tractor body at the current position.

A tracking and steering control method for a vehicle, the vehicle including a steering-controllable front wheel, a steering-controllable rear wheel and a controller, the tracking and steering control method including the following step:

during traveling of the vehicle, continually collecting steering information of the vehicle by the controller, the steering information including: information about a vehicle body position angle, a front wheel turning angle, and a rear wheel turning angle;

the vehicle body position angle is an angle representing a direction of a vehicle body; a difference between vehicle body position angles when the front wheel and the rear wheel of the vehicle respectively travel to a certain point on a travel track of the vehicle is the vehicle body turning angle; the front wheel turning angle is a wheel turning angle of a front wheel mechanism; and the rear wheel turning angle is a wheel turning angle of a rear wheel mechanism; and the controller controls the rear wheel steering so that: the rear wheel turning angle at a current position=the vehicle body turning angle at the current position−the front wheel turning angle at the current position.

DESCRIPTION OF THE EMBODIMENTS

The present invention is further described in detail below with reference to the accompanying drawings.

Embodiment 1

For a vehicle, a front wheel mechanism and a rear wheel mechanism can be both driven actively. The tracking and steering control method operates in the manner of software in a controller of the vehicle, and implements the following steps:

1) During traveling of a vehicle, continually collect steering information of the vehicle by the controller, where the steering information includes: information about a vehicle body position angle, a front wheel turning angle, and a rear wheel turning angle; the vehicle body position angle is an angle representing a direction of a vehicle body; the vehicle body turning angle is a difference between vehicle body position angles when a front wheel and a rear wheel of the vehicle respectively travel to a certain point on a travel track of the vehicle; the front wheel turning angle is a wheel turning angle of a front wheel mechanism; and the rear wheel turning angle is a wheel turning angle of a rear wheel mechanism.

2) Controller controls tracking and steering of the rear wheel, where the rear wheel turning angle at a current position=the vehicle body turning angle at the current position−the front wheel turning angle at the current position.

Figure 1:
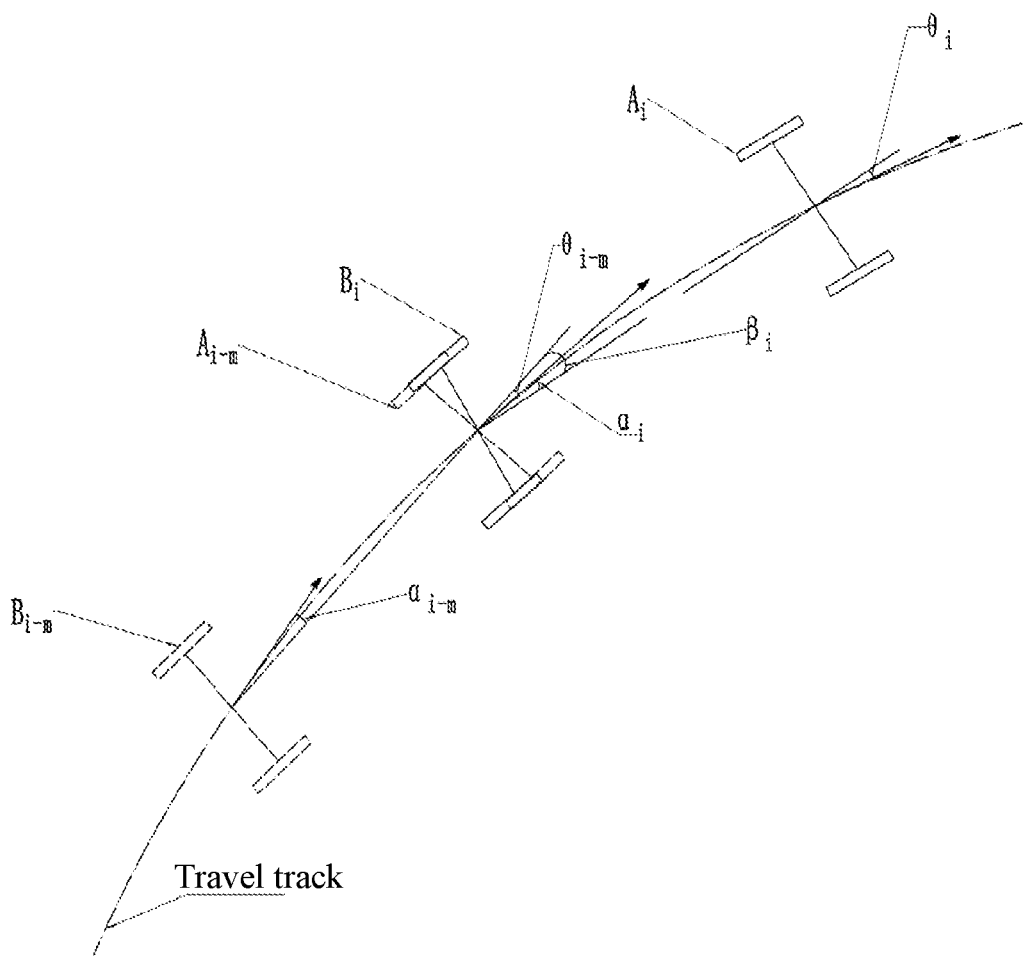
FIG. 1 is a schematic diagram of calculation of a turning angle for tracking and steering of a vehicle.

FIG. 1 is a schematic diagram of calculation of a turning angle for tracking and steering of rear wheels of a vehicle, where A represents a front wheel mechanism, B represents a rear wheel mechanism, and subscripts of A and B represent sequence numbers of collected information; m is an interval quantity of sampling periods, after m periods, rear wheels B moves to a position of front wheels A, and in is determined according to a distance between the front wheels A and the rear wheels B; a wheel turning angle is an included angle between a wheel and a vehicle body; $\theta$ represents a wheel turning angle of the front wheel mechanism, that is, a front wheel turning angle, such as $\theta_1, \theta_2, \theta_3, \ldots \theta_{i-m}, \theta_i; \ldots$, where i is a sequence number of collected information; $\alpha$ is a wheel turning angle of the rear wheel mechanism, that is, a rear wheel turning angle, such as $\alpha_1, \alpha_2, \alpha_3, \alpha_{i-m}, \ldots, \alpha_i, \ldots$; $\beta_i$ is a difference, that is, a vehicle body turning angle, between a vehicle body position angle when the rear wheels travel to a position of and a vehicle body position angle when the front wheels travel to a position of $A_{i-m}$, such as $\beta_1, \beta_2, \beta_3, \ldots \beta_{i-m}, \ldots, \beta_i, \ldots$, and the positions of $B_i$ and $A_{i-m}$ are on a same track point of the vehicle; and a direction of an arrow is a tangential direction of a travel track of the vehicle at this point, that is, a travel direction of the front wheels at this point and a travel direction of the controlled rear wheels at this point.

Figure 2:
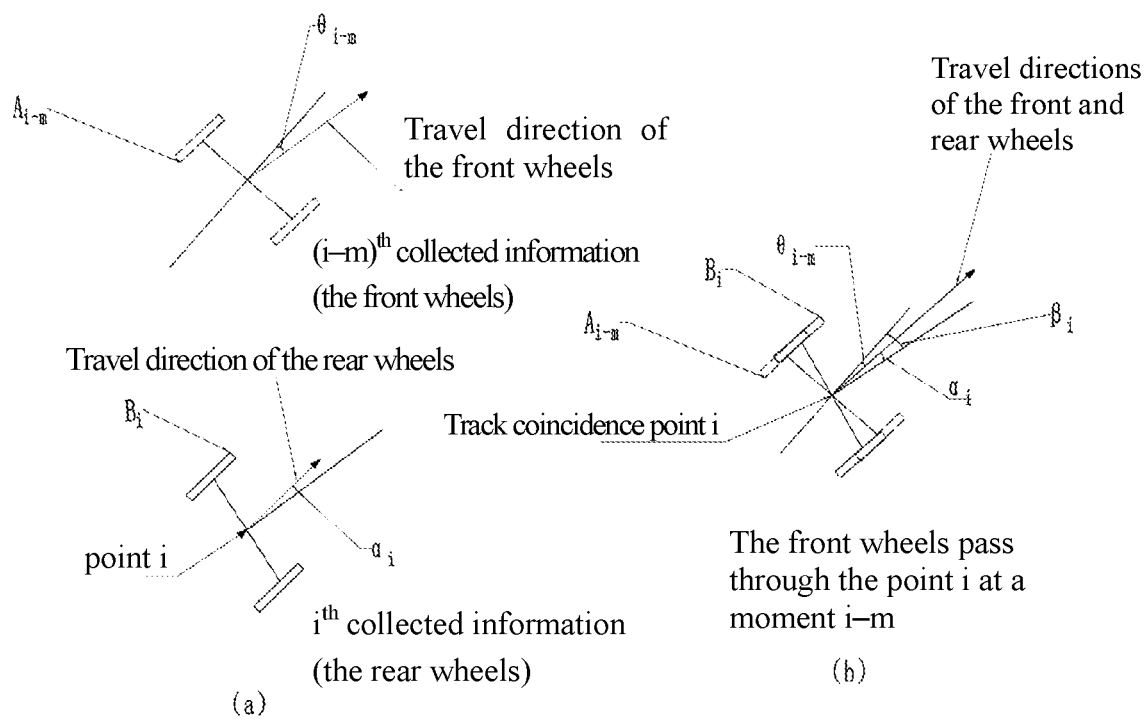
FIG. 2 illustrates analysis diagrams of calculation principles of a turning angle for tracking and steering control.

To clearly express an angular relationship, in (a) of FIG. 2, the upper figure is a schematic diagram of a front wheel turning angle when the front wheels are at a point i, that is, $A_{i-m}$, and the lower figure is a schematic diagram of a rear wheel turning angle when the rear wheels are at the point i, that is $B_i$.

To make the controlled rear wheels move forward in a direction of a track of the guiding front wheels, travel directions of $A_{i-m}$ and $B_i$ are required to be a same direction.

For convenience of observation and analysis, $B_i$ is moved to the position of $A_{i-m}$, as shown in (b) of FIG. 2. Because a direction of the vehicle body is perpendicular to a wheel shaft, an included angle between wheel shafts of $A_{i-m}$ and $B_i$ is the vehicle body turning angle $\beta_i$. According to a relationship among the three angles, $\alpha_i = \beta_i - \theta_{i-m}$.

The aforementioned method may make a rear wheel move forward along a travel track of a front wheel during turning and traveling of the vehicle, thereby greatly improving a curve-passing capability of the vehicle, mitigating a rollover trend of the vehicle, and improving stability of the vehicle.

The tracking and steering control method in the present invention is not only applicable to a common vehicle but also is applicable to vehicles having multiple compartments that are connected by using a hinge, that is, a trackless train. The following examples are described in detail.

Embodiment 2

Figure 3:
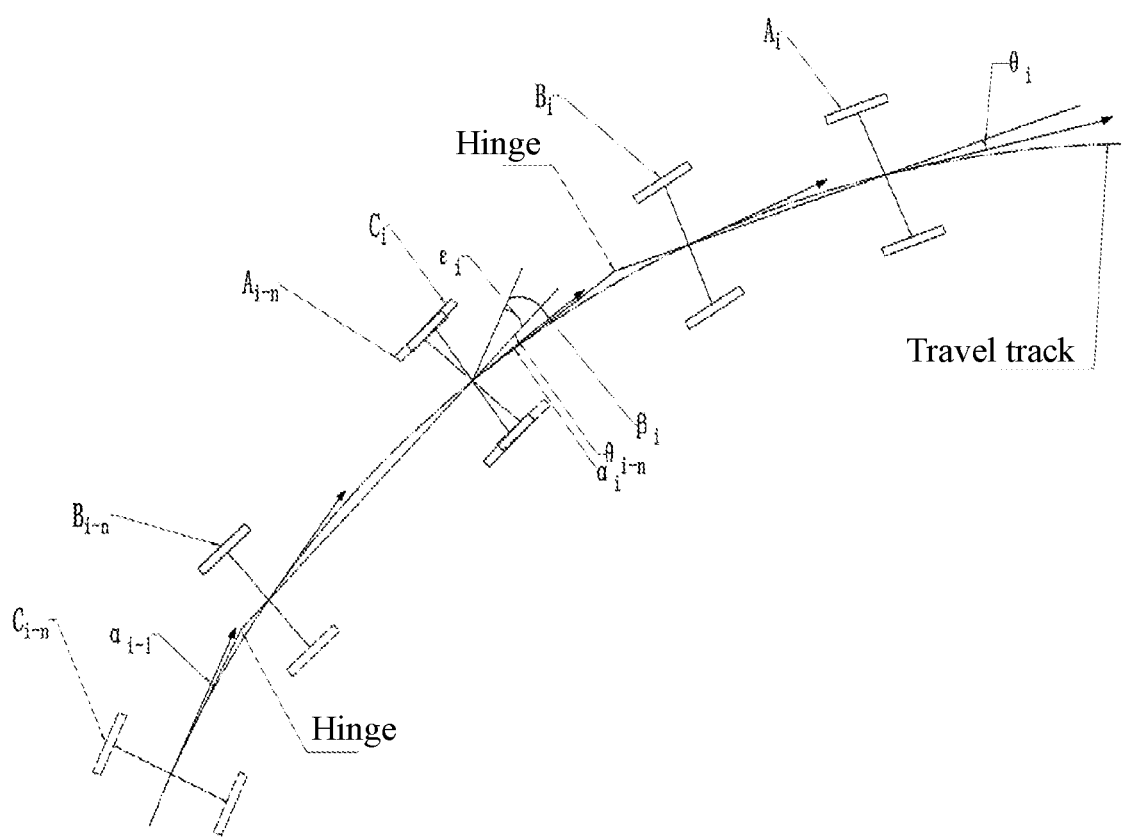
FIG. 3 is a principle diagram of Embodiment 2.

To meet requirements of passenger transport or freight transport with a large capacity, a bus includes a single-wheelset with two-compartment bus, and a freight vehicle includes a single-wheelset trailer, or the like. Steps of a tracking and steering control method for a single-wheelset hinged trailer are as follows:

FIG. 3 shows a single-wheelset trailer body. A first compartment is a tractor body, a second compartment is a trailer body, and the trailer body is connected to the tractor body by using a hinge structure. The tractor body includes a front wheelset and a rear wheelset; and the trailer includes one wheelset, where A and B represent the front wheelset and the rear wheelset of the tractor body, C represents a rear wheelset of the trailer body, and subscripts of A, B, C represent sequence numbers of collected information.

For steering control on the wheelset B, refer to Embodiment 1. However, it should be noted that, in all embodiments, definitions of θ, α, β, ε are not exactly the same, and the definitions should be subject to embodiments to which they belong.

As shown in FIG. 3, θ is a wheel turning angle of the front wheels A of the tractor body, that is, a front wheel turning angle of the tractor body; α is a turning angle of the wheels C of the trailer body, that is, a wheel turning angle of the trailer body; β is a vehicle body turning angle of the trailer body in which C is located; ε is an included angle between the trailer body in which C is located and the tractor body; a direction of an arrow is a tangential direction of a travel track of the vehicle at this point, that is, a travel direction of the front wheels at this point and a travel direction of the controlled rear wheels at this point; and n is an interval quantity of sampling periods, and represents that after n periods, the wheels C move to a position of the front wheels A.

According to an order of periods, there are front wheel turning angles $\theta_1, \theta_2, \theta_3, \ldots, \theta_{i-n}, \ldots, \theta_i, \ldots$, where i is a sequence number of a sampling period; there are rear wheel turning angles $\alpha_1, \alpha_2, \alpha_3, \ldots, \alpha_{i-n}, \ldots, \alpha_i \ldots$; there are vehicle body turning angles $\beta_1, \beta_2, \beta_3, \ldots, \beta_{i-n}, \ldots, \beta_i, \ldots$; and there are included angles between the trailer body and the tractor body: $\varepsilon_1, \varepsilon_2, \varepsilon_3, \ldots, \varepsilon_{i-n}, \ldots \varepsilon_i, \ldots$.

As can be learned from FIG. 3, to make the rear wheels C steer along a track of the front wheels A at a position of $C_i$, travel directions of wheels at $C_i$ and $A_{i-m}$ are required to be a same direction.

As can be learned from the figure, $\alpha_i = \beta_i - \varepsilon_i - \theta_{i-n}$.

Therefore, the controller controls the wheels of the trailer body steering so that a wheel turning angle of the trailer body at a current position=a turning angle of the trailer body at the current position−an included angle between the trailer body and the tractor body at the current position−a wheel turning angle of the front wheels of the tractor body at the current position.

Embodiment 3

Figure 4:
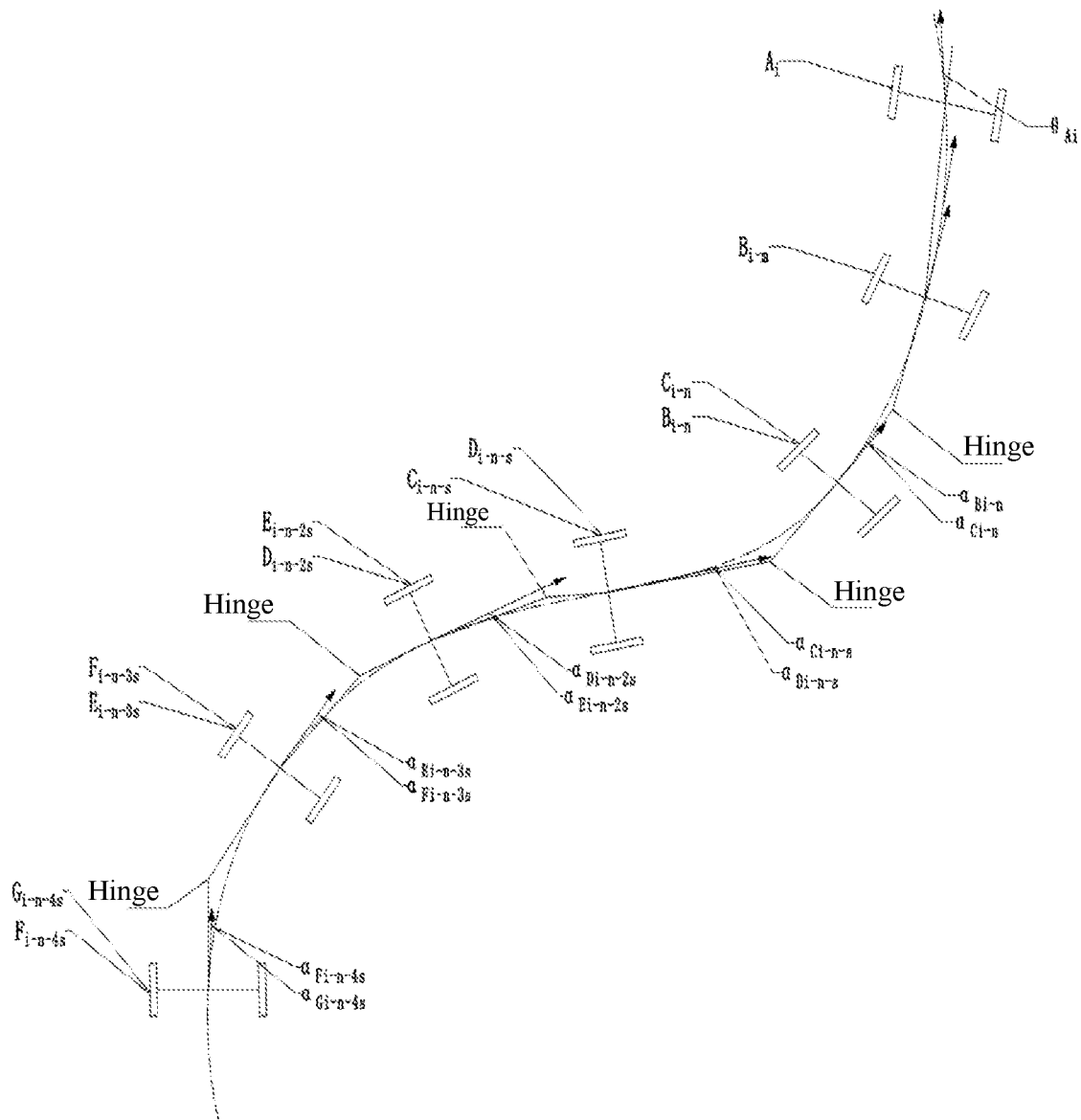
FIG. 4 is a principle diagram of Embodiment 3.

In addition to a tractor body and a first trailer body, a single-wheelset trackless train shown in FIG. 4 further includes second, third, fourth, and fifth trailer bodies, and the like. The tractor body and the first trailer body, and two adjacent trailer bodies, are respectively connected by using a hinge structure. There are wheelsets A, B, C, D, E, and F, where A and B are a front wheelset and a rear wheelset of the tractor body; C, D, E, and F are wheelsets of the trailer bodies; and D, E, F, and G respectively have a same structure as C, and are hinged to a wheel mechanism of a previous vehicle body in sequence.

For steering control on the wheelsets B and C, refer to the control method in Embodiment 2, where s is an interval for information data collection that is determined according to a distance between front and rear wheelsets of the tractor.

Because D, E, F, and G respectively have the same structure as C, to make D, E, F, and G travel along a travel track of the tractor body, travel directions of D, E, F, and G at a point i are required to be the same as a travel direction of C at the point i, where $\alpha_{Ci} = \alpha_{Di} = \alpha_{Ei} = \alpha_{Fi} = \alpha_{Gi}$.

That is, starting from the second trailer body, a wheel turning angle of each trailer body at a current position=a wheel turning angle of the first trailer body at the current position.

Embodiment 4

Figure 5:
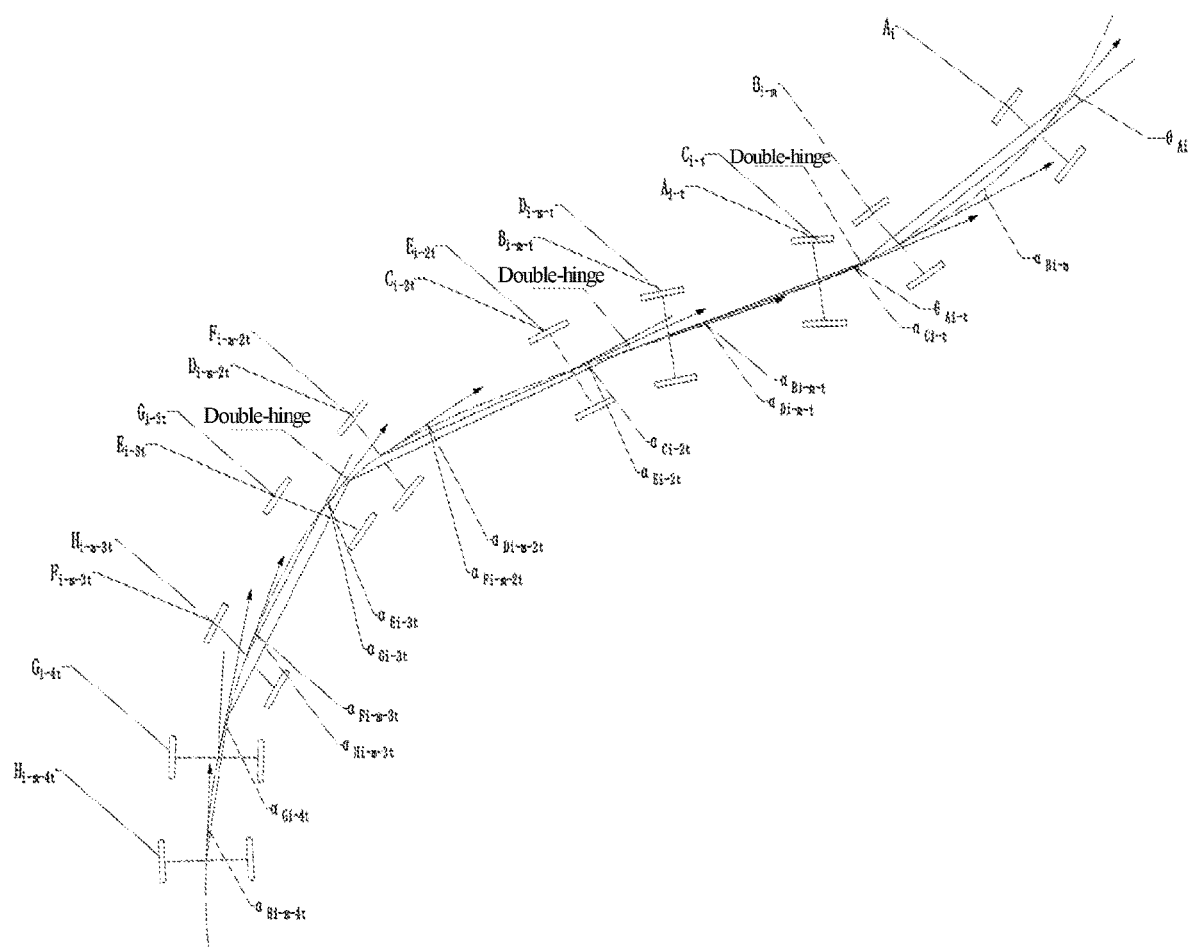
FIG. 5 is a principle diagram of Embodiment 4.

A double-wheelset trackless train means that a tractor body and a trailer body are both double-wheelset vehicle bodies having a same structure, and the vehicle bodies are connected by using double-hinge, that is, a connection bridge is disposed between any two adjacent vehicle bodies, and two ends of the connection bridge are respectively and correspondingly connected to the two vehicle bodies by using a hinge structure. A rear wheel turning angle of the double-wheelset trackless train is shown in FIG. 5. The first compartment and/or the last compartment are/is a guiding vehicle body, and other compartments are connection vehicle bodies connected by using a connection bridge. A connection vehicle body has a structure of a double-wheelset vehicle body, and includes two groups of wheel shafts. Each wheel shaft includes a left wheel and a right wheel, and a structure of the vehicle body is the same structure as the guiding vehicle body. A, B, C, D, E, F, G, and H respectively represent a wheelset, where AB, CD, EF, and GH respectively assemble a vehicle body, and are connected to a previous connection vehicle body in sequence.

In a tractor body formed by A and B, for steering control on the wheelset B, refer to Embodiment 1, where t is a quantity of intervals for information data collection that is determined according to a distance between front wheels of each vehicle body or that is determined according to a distance between rear wheels of each vehicle body.

Because each vehicle body of the double-wheelset trackless train has a same structure, to make a following vehicle body travel along a track of the tractor body, when front and rear wheelsets of each vehicle body travel to a certain position, travel directions of the front and rear wheelsets of each vehicle body are required to be respectively the same as travel directions of the front and rear wheels of the tractor body at the point, where $\theta_{Ai}$ is a wheel turning angle of a guiding front wheel at a position of Ai; and $\alpha_{Bi}$, $\alpha_{Ci}$, $\alpha_{Di}$, $\alpha_{Ei}$, $\alpha_{Fi}$, $\alpha_{Gi}$, and $\alpha_{Hi}$ are respectively wheel turning angles of the wheelsets B, C, D, E, F, G, and H at a point i.

Steering control on the wheelsets C and D, the wheelset E and F, and the wheelset G and H is as follows:

$\theta_{Ai} = \alpha_{Ci} = \alpha_{Ei} = \alpha_{Gi}$; and $\alpha_{Bi} = \alpha_{Di} = \alpha_{Fi} = \alpha_{Hi}$.

That is, the controller controls a front wheel turning angle of the trailer body at a current position=a front wheel turning angle of the tractor body at the current position, and the controller controls a rear wheel turning angle of the trailer body at the current position=a rear wheel turning angle of the tractor body at the current position.

Specific implementations are provided above, but the present invention is not limited to the described implementations. Basic ideas of the present invention are described in the foregoing basic solutions. A person of ordinary skill in the art may design various changed models, formulas, and parameters under the guidance of the present invention without creative efforts. Changes, modifications, replacements, and variations made without departing from the principle and spirit of the present invention shall still fall within the protection scope of the present invention.

What is claimed is:

1. A double-wheelset trackless train, comprising a tractor body and at least one double-wheelset trailer body, a connection bridge disposed between any two adjacent vehicle bodies, two ends of the connection bridge respectively and correspondingly connected to the two vehicle bodies by using a hinge structure, and wheelsets of the tractor body and the trailer body being steering-controllable, the double-wheelset trackless train comprising a controller, wherein during traveling of the vehicle, steering information of the vehicle is continually collected by the controller, the steering information comprising: a vehicle body position angle, a front wheel turning angle, and a rear wheel turning angle;

the vehicle body position angle is an angle representing a direction of the vehicle body, the vehicle body position angle is a first angle when a front wheel of the vehicle travels to a certain point of a travel track of the vehicle, and the vehicle body position angle is a second angle when a rear wheel of the vehicle travels to the certain point of the travel track of the vehicle; a difference between the first angle and the second angle is a vehicle body turning angle; the front wheel turning angle is a wheel turning angle of a front wheel mechanism; the rear wheel turning angle is a wheel turning angle of a rear wheel mechanism;

the controller controls the wheelset of the trailer body steering so that: the front wheel turning angle of the trailer body at a current position is equal to the front wheel turning angle of the tractor body at the current position, and the rear wheel turning angle of the trailer body at the current position is equal to the rear wheel turning angle of the tractor body at the current position; and when front and rear wheelsets of each trailer body travel to the certain point, travel directions of the front and rear wheelsets of each trailer body are the same as travel directions of front and rear wheelsets of the tractor body at the certain point.

2. The double-wheelset trackless train according to claim 1, wherein the rear wheel turning angle of the tractor body at the current position is equal to a turning angle of the tractor body at the current position minus the front wheel turning angle of the tractor body at the current position.

* * * * *